April 8, 1958  C. L. BUCHER  2,829,786
VEHICLE LOADING AND UNLOADING MECHANISM
Filed Nov. 23, 1956　　　　　　　　　　　　　　　　2 Sheets-Sheet 1
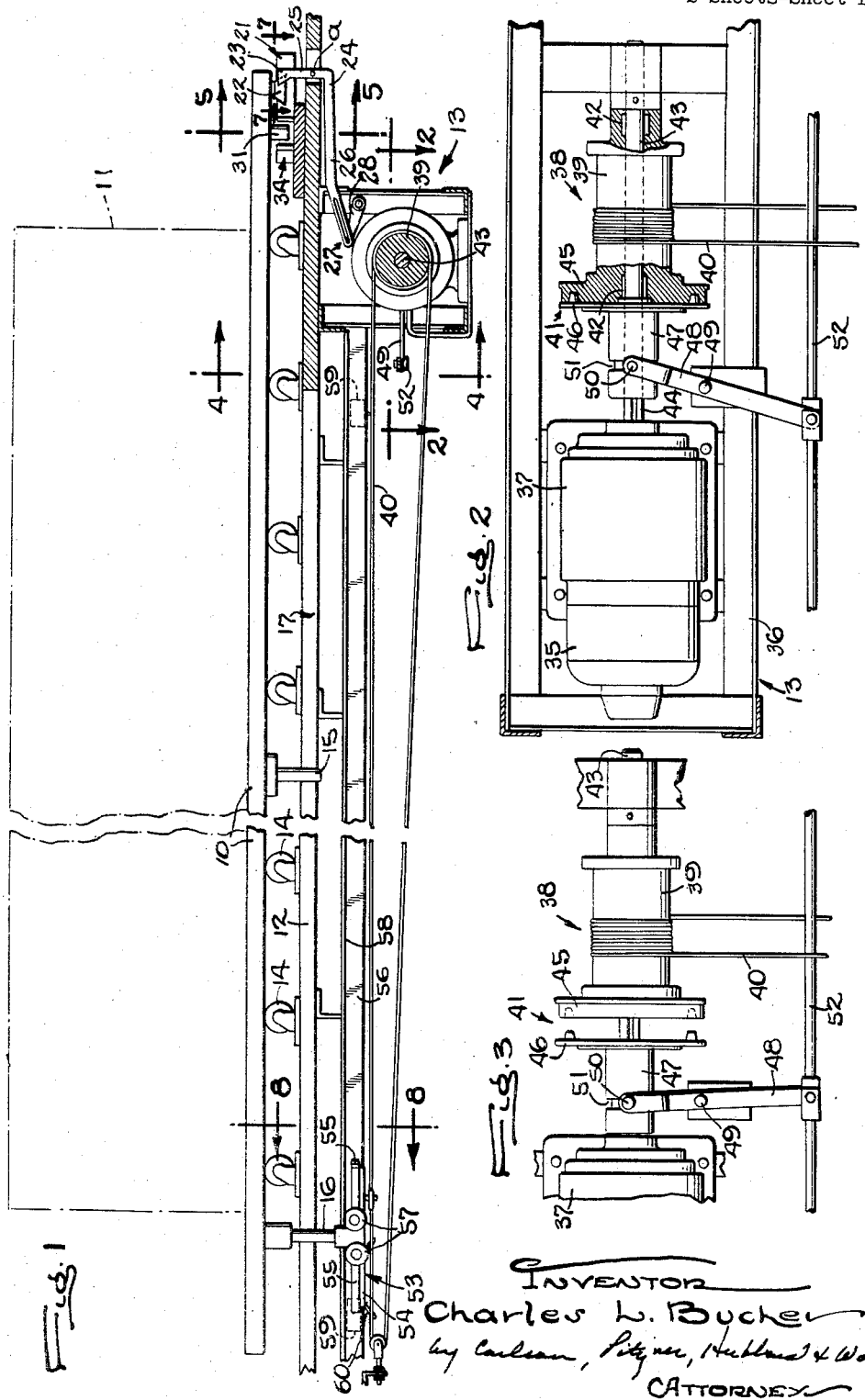

April 8, 1958  C. L. BUCHER  2,829,786
VEHICLE LOADING AND UNLOADING MECHANISM
Filed Nov. 23, 1956  2 Sheets-Sheet 2
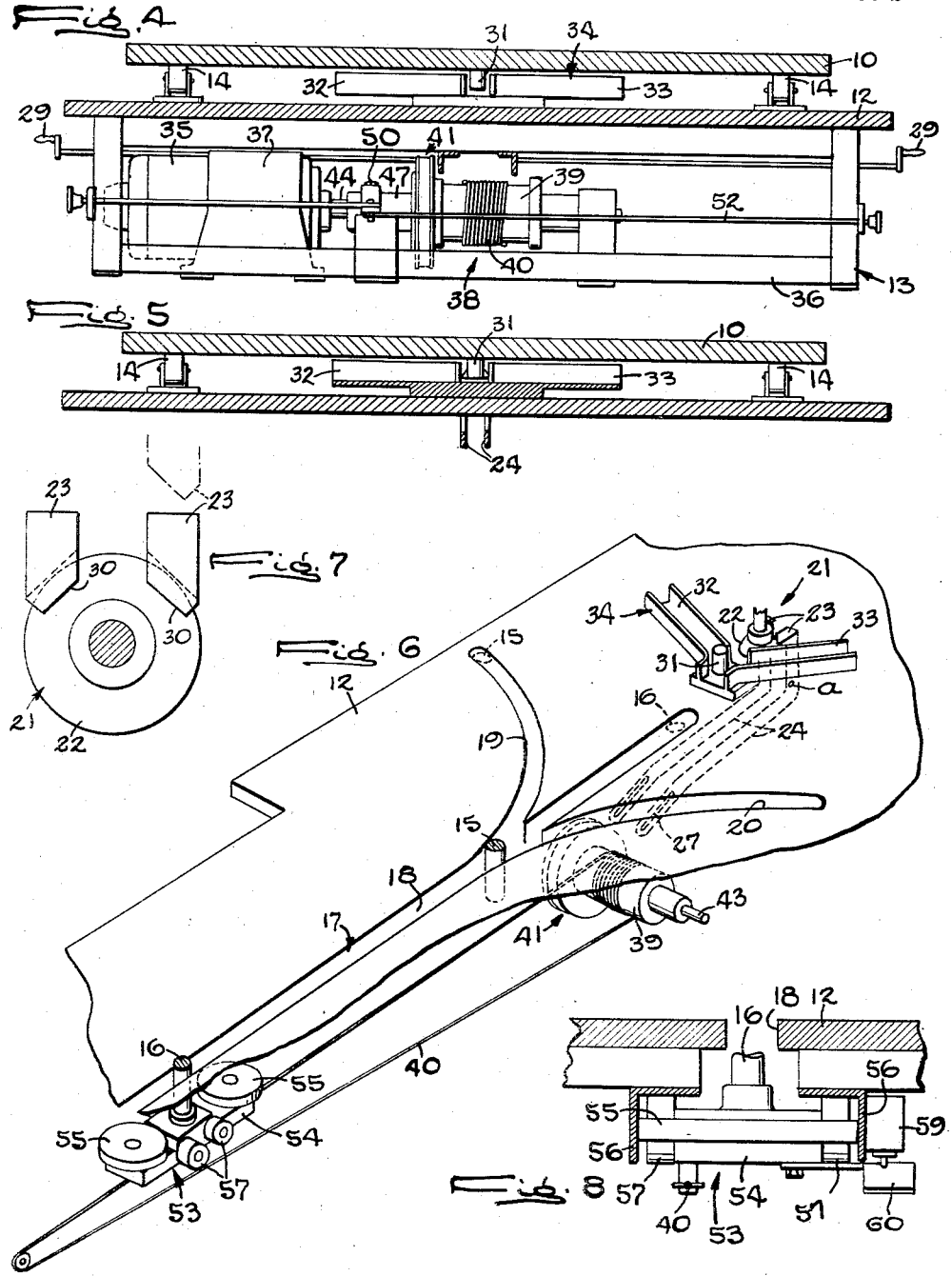
INVENTOR
Charles L. Bucher
by Coulson, Pitzner, Hubbard & Wolfe
ATTORNEY

United States Patent Office 2,829,786
Patented Apr. 8, 1958

2,829,786

VEHICLE LOADING AND UNLOADING MECHANISM

Charles L. Bucher, Freeport, Ill., assignor to Wayne Works, Inc., Richmond, Ind., a corporation of Indiana Application November 23, 1956, Serial No. 623,995

1 Claim. (Cl. 214—83.24)

This invention relates to mechanisms for unloading vehicles and, more particularly to mechanisms for loading and unloading caskets into and out of hearses.

The general object of the invention is to provide a new and improved loading mechanism of the above character which is adapted for power operation but which may be conditioned for simple and easy manual operation.

A more detailed object is to construct the loading mechanism with a novel drive connection which may be selectively coupled to the power operated elements or disconnected from those parts which impose comparatively heavy friction loads.

Other objects and advantages of the invention will become apparent from the following detailed description taken in connection with the accompanying drawings, in which Figure 1 is a fragmentary longitudinal sectional view of a loading mechanism incorporating the novel features of the present invention.

Fig. 2 is an enlarged fragmentary sectional view taken along the line 2—2 in Fig. 1.

Fig. 3 is a view similar to Fig. 2 that shows the parts in a different position.

Fig. 4 is a sectional view taken along the line 4—4 in Fig. 1.

Fig. 5 is a sectional view taken along the line 5—5 in Fig. 1.

Fig. 6 is a fragmentary perspective view of a portion of the loading mechanism.

Fig. 7 is an enlarged fragmentary sectional view taken along the line 7—7 in Fig. 1.

Fig. 8 is an enlarged fragmentary sectional view taken along the line 8—8 in Fig. 1.

As shown in the drawings for purposes of illustration, the invention is embodied in a mechanism for loading and unloading caskets in hearses. Many hearses are built with doors on each side as well as in back and the loading mechanism is arranged to be operated selectively to load or unload the casket through any one of these doors. The loading mechanism includes a table 10 supporting the casket 11 and the table is mounted on the stationary bed 12 of a frame 13 in the hearse to move back out through the rear door or to be swung to the left or right out one of the side doors.

In the present instance the movable table 10 is supported on the bed 12 by a plurality of casters 14 on the upper side of the bed and is guided by rods 15 and 16 which project down into a track 17 in the bed. As shown in Fig. 6 the track is formed by three intersecting slots in the bed, one slot 18 extending longitudinally of the hearse along the center of the bed, one slot 19 being curved and branching away to the left from the slot 18 at a point behind the forward end of the latter, and a third slot 20 also curved and branching away to the right. The rods 15 and 16 are rigid with the underside of the table, the rod 15 being disposed near the center of the table and the rod 16 being located adjacent the rear.

With the foregoing arrangement, the table 10 normally is disposed relative to the bed 12 in the position shown in Fig. 1 and, in this position, the rods 15 and 16 are located behind the intersection of the track slots 18, 19 and 20 as illustrated in Fig. 6. If it is desired to move the table out through the back door of the hearse, the table is moved rearwardly in a straight line, the rods simply traveling back in the slot 18. To move the table out one of the side doors, for example the left door, the table is moved forward and, upon such forward movement the front rod 15 is guided into the left hand curved slot 19. This turns the front end of the table toward the left and this turning continues as the rear rod moves up into the forward portion of the straight slot 18. Eventually the two rods are transversely alined as shown in broken lines in Fig. 6 at which time the table has been turned through a right angle and projected out through the side door. The table is moved out through the right door in the same manner except that, in that case, the curved slot 20 is used.

The casters 14 are arranged in two parallel rows extending along under the side edge portions of the table 10 and are secured to the top of the bed 12. If desired, the casters may be arranged to swivel about upright axes so that the wheels of the casters turn in the direction of table movement. Such swiveling facilitates the rolling of the table out through the side doors of the hearse.

To guide the front rod 15 into the left slot 19 or the right slot 20 as the table 10 moves forward, a manually operable selecting device 21 is effective to turn the front end of the table upon initial forward movement. The selecting device includes a conical roller 22 (Figs. 1 and 6) rigid with and projecting down from the forward end of the table. On each side of the roller is a locking member 23 and the two locking members are formed integrally with individual bell crank levers 24. The latter are mounted on the frame 13 to turn about horizontal axes $a$ and with the upright legs 25 carrying the locking members. The horizontal legs 26 of the lever extend rearwardly and are joined by the pin and slot connection 27 to a crank 28 which is turned by a manually operated handle 29 (Fig. 4). There is a handle and a crank for each lever so that the locking members may be moved independently of each other.

Normally the locking members 23 are disposed at the sides of the roller 22 and lock the movement of the roller to either the right or the left. When it is desired to move the table out through one of the side doors, the corresponding locking member is swung back away from the roller by turning the associated handle 29. As shown in Fig. 7, the locking members are formed with beveled surfaces 30 which engage the roller so that, when one member is retracted, the beveled surface on the other member acts as a cam. In other words, the surface on the right-hand member guides the roller to the left upon forward movement of the table provided the left-hand member is retracted. Conversely the surface on the left-hand member guides the roller to the right when the right-hand member is retracted. Thus, the locking members are effective to start the forward end of the table initially in the desired direction.

As soon as the forward end of the table starts to move to the left or to the right, a pin 31 (Figs. 1 and 6) projecting down from the underside of the table behind the roller 22 enters one of the two branches 32 and 33 of an auxiliary track 34. The latter is in the form of two upwardly opening channels, one extending forwardly and to the left and the other forwardly and to the right. The inner ends of the channels are spaced apart to permit the pin and the roller to pass between them when the table is moved back out of the rear door. As the roller passes out of engagement with the appropriate locking member 23 the pin enters one of the channels and this channel thereafter serves to guide the front end of the table in swinging either to the left or to the right.

With the pin 31 moving along one of the branches 32 or 33 of the auxiliary track 34, the rod 15 is guided into the corresponding curved slot of the track 17. Thus, to move the casket out through the left door, the left locking member first is retracted and then the table is urged in the forward direction. This moves the roller 22 along the beveled surface 30 on the right-hand locking member and, due to the bevel, the forward end of the table is turned slightly to the left. Upon such turning, the pin 31 enters the left-hand channel 32 and this causes continued turning of the forward end of the table as the latter is urged in a forward direction. Subsequently and while the pin is still within the channel, the rod 15 enters the curved slot 19 which thereafter guides the table in its turning movement until the table has been turned through a right angle. The parts function in a similar manner when moving the table 10 through the right-hand door.

The table 10 may be driven back and forth between its various positions by power and, for this purpose, a reversible motor 35 is disposed within a housing portion 36 attached to the underside of the bed 12 and constituting part of the frame 13. The motor is connected to the table through a speed reducing gearing 37 (Fig. 2) and a drive connection 38.

To permit the table 10 to be selectively operated manually or by power, the present invention contemplates the provision of a novel drive connection 38 which may be disengaged from those parts such as the motor 35 and the speed reducer 37 which imposes such large friction loads as to be incapable of manual operation. Moreover the connection itself is constructed so that it does not incorporate any parts which similarly would impose large friction loads. In general, the connection 38 includes a drum 39 which is coupled to the table by a cable 40 and to the motor by a clutch 41 which is manually operable to engage and disengage the drum from the speed reducer 37.

In the present instance, the drum 39 is journaled by means of bearings 42 (Fig. 2) on an extension 43 of the output shaft 44 of the speed reducer 37, the bearings permitting the drum to rotate independently of the output shaft. On the end of the drum adjacent the speed reducer is one element 45 of the clutch 41 which is of the jaw type. The other element 46 of the clutch is rigid with a sleeve 47 which is keyed to the output shaft 44. Thus, the sleeve and the clutch element 46 rotate with the shaft but may be moved axially relative to the latter to disengage the clutch. Such disengagement is effected by a lever 48 fulcrumed intermediate its ends on the frame 13 by a pin 49. A pin 50 rigid with the upper end of the lever projects into an annular groove 51 in the sleeve 47 and the lower end of the lever is pivotally connected to a bar 52 which extends transversely of the bed 12 and is mounted on the bed for longitudinal shifting. By shifting the rod in one direction or the other, the lever 48 is turned about its fulcrum 49 and this slides the clutch element 46 into and out of engagement with the clutch element 45 thereby connecting and disconnecting the drum 39 to the speed reducer 37.

The cable 40 is wound several turns around the drum, being attached to the drum at a central point, and its ends are connected to a trolley 53 (Figs. 1, 6 and 8) which is carried by the lower end of the rear rod 16. The trolley comprises a support 54 which is fastened to the lower end of the rod 16 and relatively large rollers 55 are journaled on the support to turn about upright axes. As shown in Fig. 8, the rollers are disposed between two angle bars 56 which are mounted beneath the bed on the opposite sides of the slot 18 and extend from one end of the slot to the other (see Fig. 1).

The rollers 55 ride along the side legs of the angle bars which thus guide the rod into the forward end of the slot 18 and prevent it from entering the curved slots 19 and 20. Two smaller rollers 57 are journaled on each side of the support 54 and turn about horizontal axes so as to roll along the undersides of the upper legs 58 of the angle bars. These rollers prevent the rear end of the table from lifting up and thus maintain the table in a horizontal position.

The trolley 53 is used to stop the motor 35 when the table 10 reaches the end of its travel. For this purpose, limit switches 59 are mounted on the frame 13 near the ends of the angle bars 56 and are actuated by a cam 60 (Fig. 8) secured to the trolley. The limit switches control the motor in a manner well known in the art.

With the arrangement described above, the table 10 is pulled forward when the drum 39 is turned clockwise as viewed in Fig. 6 and is pulled to the rear when the drum is turned in the opposite direction. The drum is turned by power when it is connected to the motor 35 and the speed reducer 37 by engagement of the clutch 41. Should it be desirable to move the table by hand however the clutch simply is disengaged and this conditions the table for manual operation. When the clutch is disengaged the only friction to be overcome for moving the table is the casters 14 and the drum 39. Since all of these parts turn relatively easily the table may be moved by the application of a comparatively small manual force.

I claim as my invention:

A vehicle loading device comprising a frame having an elongated generally horizontal bed, a generally horizontal table, means supporting said table on said bed for movement of the table relative to the bed, a main track formed on said bed and having an elongated portion extending longitudinally of the bed and two branch portions extending laterally from opposite sides of the elongated portion, a member on said table projecting into said track to move into a selected one of said branch portions and turn the table, a device for guiding said member into a selected one of said branch portions and including auxiliary branch tracks paralleling said branch portions and a second member on said table projecting into the auxiliary branch tracks, a cam follower on said table, two cams mounted on said bed and selectively engageable with said follower, each of said cams being operable to guide said second member into one of said auxiliary branch tracks thereby to guide said first member into a corresponding one of said branch portions, a reversible motor mounted on said frame, a speed reducer having an input connected to the output of said motor and having an output shaft extending beyond and exteriorly of the speed reducer, a drum spaced laterally from said speed reducer and journaled on said shaft to rotate freely relative to the shaft, a jaw clutch disposed between said speed reducer and said drum and having one element rigidly connected to the drum and the other element keyed to said shaft to rotate therewith and to slide axially along the shaft, manually operable means for sliding said other element into and out of engagement with said one element to permit said drum to be turned by power or by hand, and a length of cable having its intermediate portion wrapped around said drum and its end portions connected to said table whereby the table moves back and forth along the paths selected by said cams as said drum is turned in one direction or the other.

References Cited in the file of this patent

UNITED STATES PATENTS

| | | |
|---|---|---|
| 2,063,912 | Fitch | Dec. 15, 1936 |
| 2,109,701 | Jordan et al. | Mar. 1, 1938 |
| 2,177,411 | Krogh | Oct. 24, 1939 |